United States Patent
Jin et al.

(10) Patent No.: US 9,418,447 B2
(45) Date of Patent: Aug. 16, 2016

(54) SINGLE-IMAGE SPECULAR REFLECTION SEPARATION

(71) Applicant: Adobe Systems Incorporated, San Jose, CA (US)

(72) Inventors: Hailin Jin, Campbell, CA (US); Hyeongwoo Kim, Gyeonggi (KR); Sunil Hadap, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 607 days.

(21) Appl. No.: 13/859,468

(22) Filed: Apr. 9, 2013

(65) Prior Publication Data
US 2014/0301637 A1    Oct. 9, 2014

(51) Int. Cl.
*G06T 7/40* (2006.01)

(52) U.S. Cl.
CPC ..................... *G06T 7/408* (2013.01)

(58) Field of Classification Search
None
See application file for complete search history.

(56) References Cited

PUBLICATIONS

Shen, Hui-Liang—"Simple and efficient method for specularity removal in an image"—2009 Optical Society of America, pp. 2711-2719.*
Shen, Hui-Liang—"Chromaticity-based separation of reflection components in a single image"—Pattern Recognition 41—2008 Elsevier Ltd, pp. 2461-2469.*

* cited by examiner

*Primary Examiner* — Bernard Krasnic
(74) *Attorney, Agent, or Firm* — Kilpatrick Townsend & Stockton LLP

(57) ABSTRACT

Systems and methods are discussed to separate the specular reflectivity and/or the diffuse reflectivity from an input image. Embodiments of the invention can be used to determine the specular chromaticity by iteratively solving one or more objective functions. An objective function can include functions that take into account the smooth gradient of the specular chromaticity. An objective function can take into account the interior chromatic homogeneity of the diffuse chromaticity and/or the sharp changes between chromaticity. Embodiments of the invention can also be used to determine the specular chromaticity of an image using a pseudo specular-free image that is calculated from the input image and a dark channel image that can be used to iteratively solve an objective function(s).

7 Claims, 10 Drawing Sheets
(8 of 10 Drawing Sheet(s) Filed in Color)

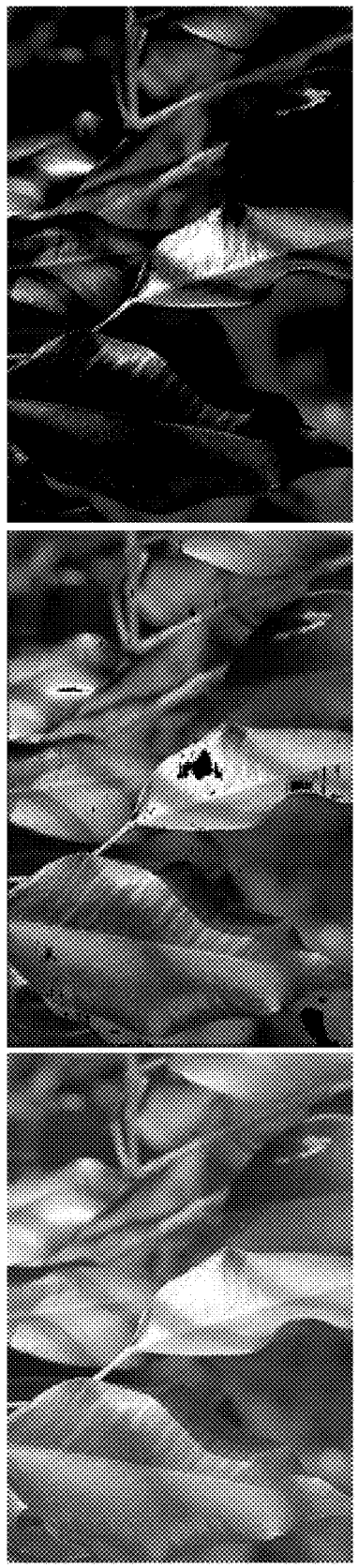
*Figure 8C*  *Figure 8B*  *Figure 8A*

SINGLE-IMAGE SPECULAR REFLECTION SEPARATION

FIELD

This disclosure relates generally to image processing.

BACKGROUND

The observed color of an image is formed from the spectral energy distributions of the light reflected by the surface reflectance, and the intensity of the image color is determined by the imaging geometry. Diffuse reflection can be assumed to be associated only with the relative angle between the light direction and the surface normal in the imaging geometry regardless of the viewing direction. Specular reflection, on the other hand, is dependent on the viewing direction. This viewing dependency of the specular reflection can lead to problems in many computer vision applications such as stereo matching, segmentation, and/or recognition.

Stereo matching extracts of 3D information from digital images by comparing information about a scene from two vantage points. Because specular reflection changes depending on the view point, if one of the two images under comparison to extract 3D information includes specular reflections and the other does not, large intensity differences may be present. This can lead to miscalculations of 3D information from these two images. Despite this potential for error, it is common to assume that specular reflections do not exist in the images.

Image segmentation is the process of assigning a label to every pixel in an image such that pixels with the same label share certain visual characteristics. A specular reflection within an image shows the reflection rather than the object upon which the reflection occurs. As such the color and/or intensity of pixels representing the specular reflection may not be labeled with the object, which is the object of image segmentation. This can lead to pixels being mislabeled or segmented. Similar problems can occur in image recognition techniques.

Most applications simply consider the observed image as a diffuse reflection model and disregard the specular reflection components because they are considered outliers.

SUMMARY

Embodiments of the invention include a method for determining the specular reflectivity within an input image. Embodiments of the invention can include receiving an input image at a computer device that. The input image can include a red channel, a green channel, and a blue channel for each pixel in the input image. A dark channel image can be calculated from the input image. The dark channel image can comprise an image for each pixel value having the lowest pixel value of the corresponding red channel pixel, green channel pixel, and blue channel pixel of the input image. A pseudo specular-free image can be calculated as the difference between the input image and the dark channel image. A specular chromaticity of the input image can be determined from the pseudo specular-free image, which can be returned.

Embodiments of the invention can also receive an input image at a computer device. The input image can include a red channel, a green channel, and a blue channel for each pixel in the input image. A cluster analysis can be performed on the input image that clusters each pixel in the input image into clusters having similar chromaticity. The cluster analysis can determine a chromaticity index for each pixel and a chromaticity vector that indicates the average chromaticity of each cluster represented by the index. An objective function can then be solved to determine the specular reflectivity of the input image. This objective function can have a number of properties. For example, the objective function can include a function that specifies that the specular reflectivity is smooth across edges within the input image. As another example, the objective function can specify that the diffuse reflectivity is relatively constant for the same chromaticity. As another example, the objective function can specify that the diffuse reflectivity is relatively constant within each cluster. As yet another example, the objective function can specify that the diffuse reflectivity changes sharply between clusters. As yet another example, the objective function can specify a combination of any of these or other objective functions. The specular reflectivity of the input image can then be returned.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings. The patent or application file contains at least one drawing executed in color. Copies of this patent or patent application publication with color drawing(s) will be provided by the Office upon request and payment of the necessary fee.

FIGS. 8A, 8B and 8C show an input image and the specular layer calculated using conventional techniques and embodiments of the invention.

DETAILED DESCRIPTION

Systems and methods are disclosed to separate the specular reflectivity and the diffuse reflectivity from an input image. Images are a representation of light reflected off objects framed within the image. The reflected light captured in an image can either be from a diffuse reflection or a specular reflection. It has proven challenging to accurately distinguish between diffuse reflection and specular reflection. Because diffuse reflections make up the majority of the light in an image and noting that challenges exist in separating the two, most image processing applications assume all the light in an image is diffuse.

In some embodiments of the invention, the chromaticity of an image can be analyzed. The chromaticity of an image represents the color of the image (or even a pixel) regardless of the brightness (or luminance) of the image. Hence, it can be assumed that the diffuse chromaticity of an image can represent the true (or inherent) color of a surface, and the specular chromaticity can represent the true (or inherent) illumination of the surface. Thus, an image can be separated into the diffuse chromaticity and the specular chromaticity.

Figures 1A, 1B, 1C:
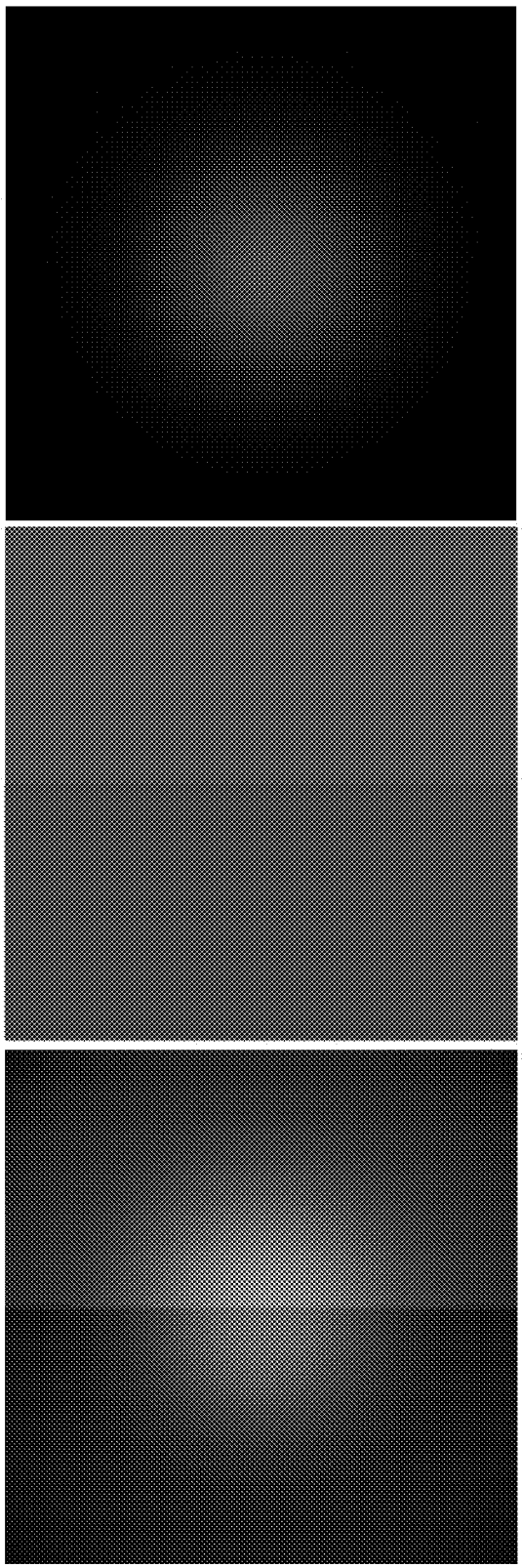
FIGS. 1A, 1B and 1C show a synthetic image and its diffuse and specular components generated to illustrate various embodiments of the invention.

FIGS. 1A, 1B and 1C show an example of how an image can be separated into diffuse and specular portions. FIG. 1A shows an image created from the diffuse chromaticity shown in FIG. 1B and the specular chromaticity shown in FIG. 1C. FIG. 1B shows the diffuse chromaticity component of the image, which when compared with FIG. 1C includes all the color information. In particular, this image shows two vertical panels with separate and distinct colors. FIG. 1C shows the specular chromaticity component of the image, which represents illumination and is agnostic regarding color (hence the grayscale image). FIG. 1A is the linear combination of FIG. 1B and FIG. 1C.

Figure 2A:
FIGS. 2A and 2B show a photograph of fruit representing diffuse and specular components of a real image.

FIG. 2A is a photograph of a lemon, pear and apple. In this image specular reflection 205 is shown by the glare reflected off each piece of fruit or the shiny reflection. The specular reflections are a small portion of the entire image. The apple, in particular, shows a strong specular reflection. Because it is such a minor aspect of the image, it can be common to ignore the contribution of the specular reflections. But doing so risks misunderstanding the objects in the image. As noted above, it can be seen in this image that the diffuse reflectivity captured in this image represents the true color of the fruit in the image.

Figure 2B:
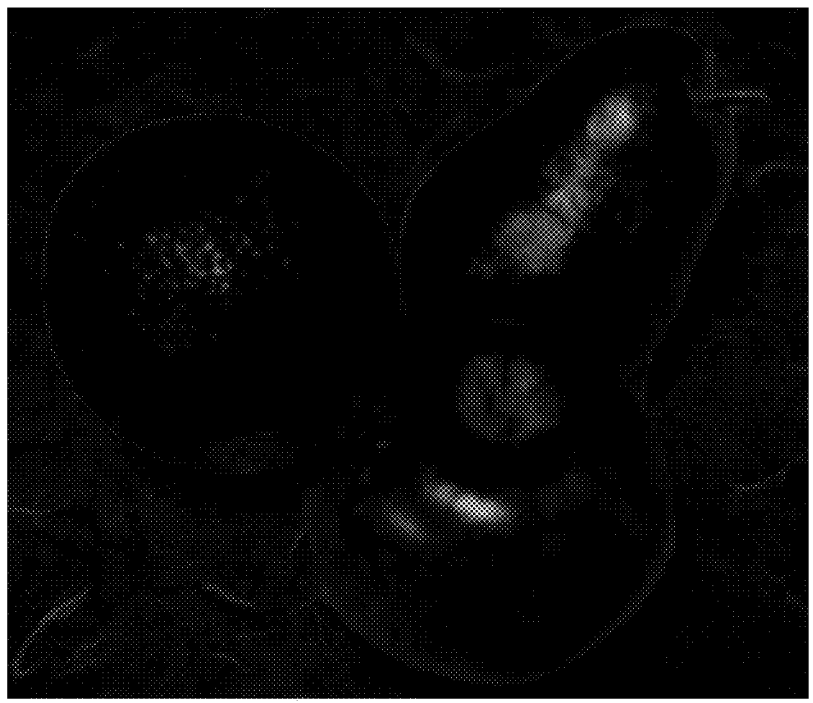

FIG. 2B shows the specular reflection layer of FIG. 2A created using embodiments of the invention. As shown in the image, only the portions of the image representing the specular reflections (e.g., specular reflection 205) show up in this image.

Embodiments of the invention can be used on any image.

Techniques and systems are disclosed herein for determining or estimating the specular chromaticity, the diffuse chromaticity, or both from an input image. Embodiments of the invention can be used to determine the specular chromaticity by iteratively solving one or more objective functions.

Objective functions are commonly used in optimization problems. An objective function can be defined to represent various conditions or parameters that exist in specular and/or diffuse reflectivities. By setting up an objective function that represents a linear combination of a number of conditions or parameters, the relative contribution of each of these conditions or parameters can be determined. Using any number of optimization techniques, an objective function can be maximized or minimized by systematically choosing input values and then computing the value of the function. The following describes the reasoning behind the selection of an exemplary objective function. An exemplary simplified objective function and initialization parameters are described.

In some embodiments one component of the objective function(s) can be chosen to represent the smooth gradient of the specular chromaticity. As shown in FIG. 1C, the specular chromaticity changes smoothly across the image; there are no abrupt changes in the specular chromaticity.

Moreover, a portion of the objective function can be chosen to take into account the interior chromatic homogeneity of the diffuse chromaticity and/or the sharp changes between chromaticity. This is shown in FIG. 1B, where the chromaticity (or color) of each vertical panel is homogeneous within the boundaries of the panel. Yet, at the line where the color changes from one chromaticity to the other, this change occurs abruptly. Examples of objective functions that take into account these features are described in detail below.

Embodiments of the invention can determine the specular chromaticity of an image using a pseudo specular-free image that is calculated from the image and a dark channel image, which is a composite image from the red, green and blue channels of the image and is described in detail below. Typically, each frame is defined as a mix of red, green and blue colors. Each pixel, therefore, can be represented as a linear combination of red, green, and blue values. These different values are often called channels such as the red channel, the blue channel, and the green channel. This pseudo specular-free image can be used to iteratively solve one or more objective functions. Each pixel of the dark channel image can have for each pixel value the lowest pixel value of the corresponding red channel pixel, green channel pixel, and blue channel pixel. In some embodiments, this pseudo specular-free image can preserve color boundaries (chromaticity clusters) and/or can improve results when color channels are ambiguous in saturation values.

An input image I(x) can include red, blue and green channels. As noted above the reflectivity of the input image I(x) can be considered a combination of the diffuse, $I_d(x)$, and specular layers, $I_s(x)$:

$$I(x) = I_d(x) + I_s(x). \tag{1}$$

This is shown in FIG. 1A where the image is a combination of the diffuse image shown in FIG. 1B and the specular image shown in FIG. 1C.

In some embodiments the chromaticity of an image can be represented as a normalized color vector. The normalized color vector, for example, can represent each pixel for each channel as the pixel value divided by the sum of all pixel values in the channel:

$$\tilde{I}(x) = \frac{I(x)}{\sum_{c \in \{r,g,b\}} I_c(x)}, \tag{2}$$

where $I_c(x)$ is one of the color channels.

The diffuse chromaticity layer can be represented as $\Lambda(x)$ and the specular chromaticity layer can be represented as $\Gamma(x)$. The chromaticity can then be rewritten as:

$$I(x) = m_d(x)\Lambda(x) + m_s(x)\Gamma(x), \tag{3}$$

where $m_d$ and $m_s$ are the diffuse and specular reflection coefficients, respectively, which can depend on the imaging geometry.

In some embodiments of the invention, the specular chromaticity can be assumed to be uniform for a given image. That is, the red, green and blue channels contribute equally to the specular chromaticity:

$$\Gamma_r(x)=\Gamma_g(x)=\Gamma_b(x)=1/3. \quad (4)$$

Without loss of generality, this can be achieved, for example, by normalizing the illumination chromaticity estimated from as a preprocessing step.

According to some embodiments of the invention, the specular component $I_s(x)$ can be estimated by first estimating the specular reflection coefficient $m_s(x)$ from the observed image $I(x)$ and multiplying the specular reflection coefficient $m_s(x)$ by the uniform specular chromaticity $\Gamma$. That is, the specular layer can be found from:

$$I_s(x)=m_s(x)\Gamma. \quad (5)$$

The dichromatic reflection model in the chromaticity space can be represented as:

$$\tilde{I}(x) = \alpha(x)\Lambda(x) + (1-\alpha(x))\Gamma(x) \quad (6)$$

where $$\alpha = \frac{m_d}{(m_d + m_s)}. \quad (7)$$

Using equation (7), the specular reflection coefficient $m_s(x)$ can be recovered from $$1 - \alpha\left(\frac{m_d}{(m_d + m_s)}\right)$$

by the denormalization of intensities:

$$\sum_{c \in \{r,g,b\}} I_c = \sum_{c \in \{r,g,b\}} (m_d\Lambda + m_s\Gamma) = m_d + m_s. \quad (8)$$

From this, the likelihood of the specular layer separation can be written as:

$$E_D(\alpha,\Lambda)=\Sigma_x(\tilde{I}(x)-(\alpha(x)\Lambda(x)+(1-\alpha(x))\Gamma)^2. \quad (9)$$

This likelihood function can then be used in an iterative optimization problem to solve for $\alpha(x)$. However, embodiments of the invention include linear additions to the likelihood function. These can include, for example, a smoothness component that acts on the specular layer and/or an interior homogeneity component that acts on the diffuse portion.

In some embodiments, the smoothness component can be defined by the gradient of the specular component. The gradient can represent smoothness across edges. FIG. 1C is a visual representation of how the specular layer is smooth across the image. The image does not include any sharp changes across the image. This smoothness can be defined mathematically in a number of ways. For instance, the gradient of the chromaticity can be continuous and/or can have a gradual slope in the vector field. This can be represented, for example, by the gradient of the specular chromaticity values $(1-\alpha(x))$. Moreover, in some embodiments, the diffuse reflection can be assumed to be constant on the same chromaticity in the rg chromaticity space (the red and green channels). Thus, in some embodiments, a smoothness likelihood function can be defined as:

$$E_s(\alpha)=\Sigma_x\|\nabla(1-\alpha(x))\|_2, \quad (10)$$

where, the gradient, $$\nabla = \left(\frac{\partial}{\partial x}, \frac{\partial}{\partial y}\right)^T.$$

In some embodiments, the interior homogeneity component of the likelihood function can act on the diffuse component of the input image. As shown in FIG. 1B the diffuse layer can be assumed to be homogeneous within color groups. In this example, the two color panels have the same color within each panel. And the color changes abruptly. That is there is a sharp line between the two panels. A color homogeneity likelihood function that acts on the diffuse layer of the input image can be defined as:

$$E_c(\Lambda,\lambda)=\Sigma_x\|\nabla\Lambda_\lambda(x)\|_1+\beta_\lambda\|\lambda(x)\|_0, \quad (11)$$

where $\lambda=\{1,\ldots,N\}$ denotes the index for a set of chromaticities within the input image and $\Lambda_\lambda(x)$ returns the chromaticity which $\Lambda(x)$ indicates. $\beta_\lambda$ is the weight to control the amount of sparsity on the diffuse chromaticity.

In some embodiments the likelihood functions noted above in equations (9), (10) and (11) can be combined as a linear combination of functions:

$$E(\alpha,\Lambda,\lambda)=E_D(\alpha,\Lambda)+\beta_s E_S(\alpha)+B_c E_C(\Lambda,\lambda), \quad (12)$$

where $\beta_s$ and $\beta_c$ are the regularization weights. To ease the computational difficulties with this equation, the continuous and discrete variables can be uncoupled with an auxiliary variable, such that:

$$E_c(\Lambda,\lambda,\tilde{\lambda})=\Sigma_x\|\nabla\Lambda_\lambda(x)\|_1+\beta_\lambda\|\tilde{\lambda}(x)\|_0. \quad (13)$$

Figure 4:
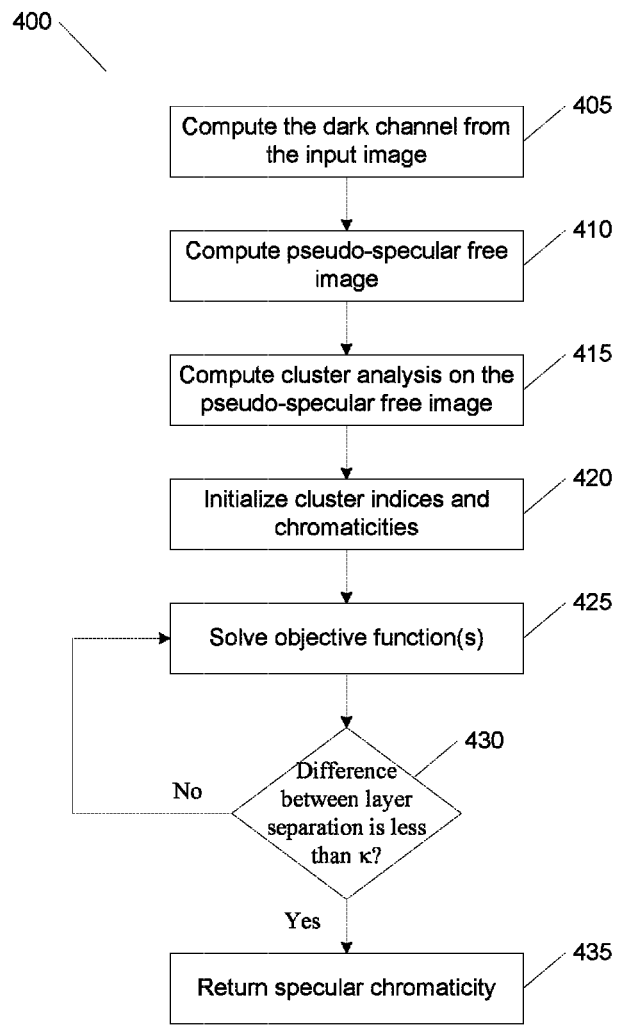
FIG. 4 is a flowchart of a process for determining the specular chromaticity from an image according to some embodiments of the invention.

Now, equation (12) can be rewritten as:

$$E(\alpha, \Lambda, \lambda, \tilde{\lambda}) = E_D(\Lambda, \alpha) + \beta_s E_s(\alpha) + \beta_c E_c(\Lambda, \lambda, \tilde{\lambda}) + \frac{1}{2\theta}(\lambda, -\tilde{\lambda})^2. \quad (14)$$

where $\tilde{\lambda}$ is the auxiliary variable for $\lambda$ of which the similarity is controlled by $\theta$. As $\theta \to 0$ equation (14) becomes equation (12). Equation (14) can be solved for $\lambda$ and $\alpha$, to return the specular reflectivity. FIG. 4 outlines an example of a process for solving this equation. Equation (12) can be used to solve for $\lambda$ and $\alpha$ using any optimization algorithm.

In some embodiments of the invention, a dark channel can be used to determine the diffuse chromaticity and specular chromaticity. This dark channel can be used to solve any optimization process; for example, the optimization processes outlined in FIG. 4. Each pixel of the dark channel image can have the lowest pixel value of the corresponding red channel pixel, green channel pixel, and blue channel pixel:

$$I^{dark}(x)=\min_{c\in\{r,g,b\}}I_c(x). \quad (15)$$

The dark channel can be used to calculate a pseudo specular-free image:

$$I_c^{pseudo}(x)=I_c(x)-I^{dark}(x). \quad (16)$$

This pseudo specular-free image, created from the dark channel, can be used to initialize any algorithm used to separate specular reflections from a single image.

Use of a pseudo specular-free image can provide one or more benefits. For example, such an image does not have any ambiguity in the saturation value so that color boundaries can be preserved. This property can allow for accurate separation of the specular reflection in the presence of colors ambiguous in saturation value. As another example, this pseudo specular-free image can directly provide specular reflection in case the diffuse reflection of an object has low value in the saturation component.

Figure 3B:
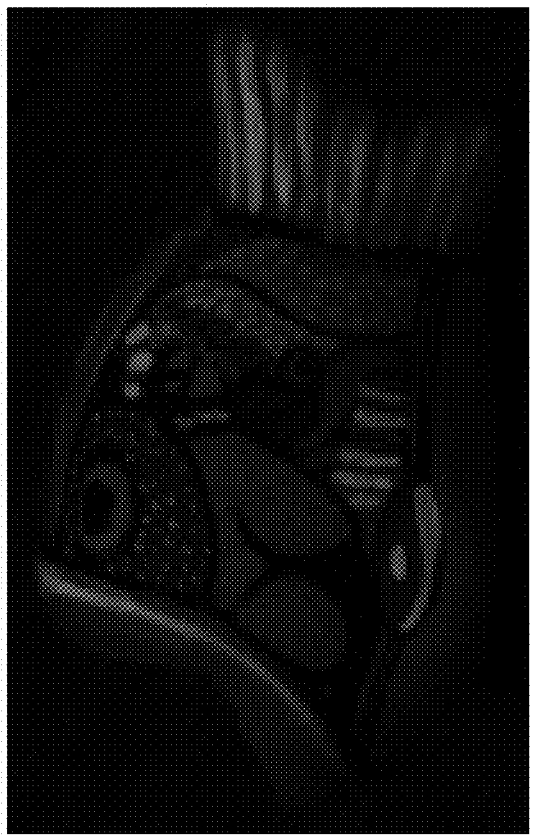
FIGS. 3A and 3B show pseudo specular images calculated using conventional techniques and embodiments of the invention.
Figure 3A:
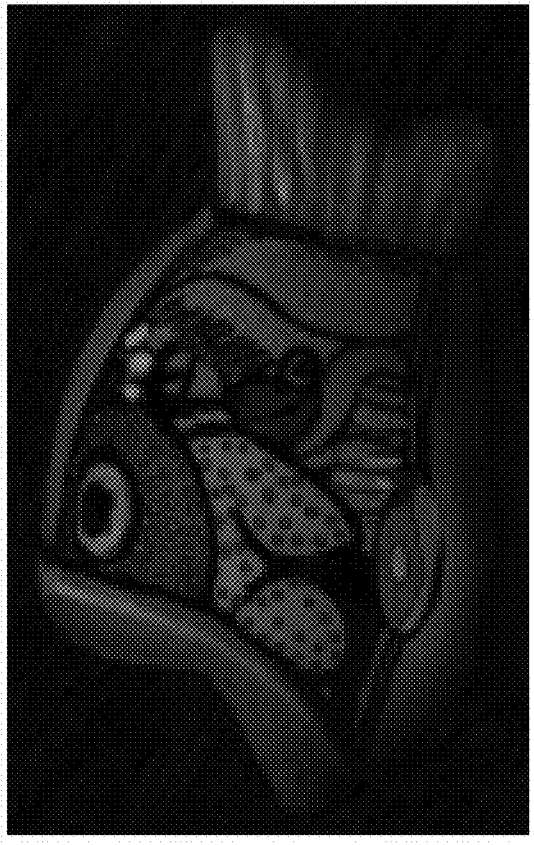

FIG. 3A shows a pseudo specular image calculated using a conventional technique. FIG. 3B shows a pseudo specular image calculated using embodiments of the invention. Note that the conventional technique regards colors with the same hue but different saturation values as specular reflection and the technique described herein provides an image that does not have the ambiguity in the saturation value. This can help preserve color boundaries, which can help separate the specular reflection in the presence of colors ambiguous in saturation value. Moreover, the image shown in FIG. 3B can provide specular reflection in case the diffuse reflection of a object has low value in the saturation component.

FIG. 4 shows a process 400 for computing the specular reflectivities for a given image according to some embodiments of the invention. At block 405 the dark channel can be computed from the input image. This can be done, for example, using equation (15). At block 410 a pseudo specular-free image can be determined using the dark channel; for example, using equation (16). In some embodiments, this pseudo specular-free image can be determined from the normalized image as discussed above.

At block 415 the pseudo specular-free image can be clustered into regions of similar chromaticity. For example, the pseudo specular-free image can be clustered based on the color of the regions within the image. The image can be clustered using any type of cluster analysis. The clustering can return an image (or matrix having the same dimension as the image) where each pixel indicates an index, $\lambda$, representing each clustered chromaticity. A chromaticity vector, $\Lambda$, can also be returned that indicates the average chromaticity of each cluster represented by index, $\lambda$. If there are five clusters in the image, then each pixel can be represented by index, $\lambda$, for example, with a number from 1 to 5. The chromaticity vector, $\Lambda$, can then include the five average values of each chromaticity.

Any type of clustering analysis can be performed. For example, clustering can be performed using k-means clustering, hierarchical clustering, centroid-based clustering, distributed-based clustering, Lloyd's algorithm, k-medians clustering, the expectation-maximization algorithm, density based clustering, linkage clustering, the CLARANS algorithm, the BIRCH algorithm, and/or canopy clustering.

In some embodiments the clustering can operate on the input image. In some embodiments this clustering can operate on the pseudo specular-free image.

At block 420 cluster indices and chromaticity values can be initialized. For example, initial index $\lambda^0$, with the initial cluster indices $\Lambda^0$ can be found in block 415. Then, the initial $\alpha^0$ can be found by solving:

$$E_D(\alpha,\Lambda) = \Sigma_x(\tilde{I}(x) - (\alpha(x)\Lambda(x) + (1-\alpha(x))\Gamma)^2. \quad (17)$$

At block 425 these initial values can be used in one or more objective functions. For example, to solve for optimized indices in chromaticity space, $\tilde{\lambda}^{t+1}$, for fixed $\alpha^t$, $\lambda^t$, and $\Lambda^t$, where initially t=0, the following objective function can be solved for $\tilde{\lambda}^{t+1}$:

$$\min_{\tilde{\lambda}} \left\{ \beta_{\tilde{\lambda}} \|\tilde{\lambda}(x)\|_0 + \frac{1}{2\theta}(\lambda(x) - \tilde{\lambda}(x))^2 \right\}, \quad (18)$$

where $\beta_{\tilde{\lambda}} = \beta_c \beta_\lambda$.

As another example, to solve for optimized indices space, $\lambda^{t+1}$, for fixed $\alpha^t$, $\tilde{\lambda}^t$, and $\Lambda^t$, the following objective function can be solved:

$$\min_\lambda \left\{ \beta_c \sum_x \|\nabla \Lambda_\lambda(x)\|_1 + \frac{1}{2\theta}(\lambda(x) - \tilde{\lambda}(x))^2 \right\} \quad (19)$$

And to solve for $\alpha^{t+1}$ and $\Lambda^{t+1}$ for fixed $\lambda^t$ and $\tilde{\lambda}^t$ the following objective function can be solved:

$$\min_{\alpha,\Lambda} \left\{ \sum_x (\tilde{I}(x) - (\alpha(x)\Lambda(x) + (1-\alpha(x))\Gamma))^2 + \beta_s \sum_x \|\nabla(1-\alpha(x))\|_2 + \beta_c \sum_x \|\nabla \Lambda_\lambda(x)\|_1 \right\} \quad (20)$$

In some embodiments some portions of equation (20) can be left out. For example, the function can be computed without the $\beta_c \Sigma_x \|\nabla \Lambda_\lambda(x)\|_1$ term. As another example, the function can be computed without the $\beta_s \Sigma_x \|\nabla(1-\alpha(x))\|_2$ term. Various other combinations of objective functions can be used.

With these values in mind, at block 430 it can be determined whether the difference between consecutive specular layer separation values is less than some parameter. For example, this occurs when the difference between equation (13) and equation (14) is less than some error parameter $\kappa$.

$$E(\alpha^{t+1},\Lambda^{t+1},\lambda^{t+1},\tilde{\lambda}^{t+1}) - E(\alpha^t,\Lambda^t,\tilde{\lambda}^t) < \kappa. \quad (21)$$

In the event the difference is greater than error parameter $\kappa$ then process 400 returns to block 425 and repeats optimization of the objective function(s) with the new values obtained in the previous iteration.

If the difference is less than error parameter $\kappa$, then process 400 proceeds to block 435. Using the chromaticity indices $\lambda^t$ and $\alpha^t$, the specular chromaticity, $I_s(x)$ can be returned using equations (5), (7) and (8).

Figure 5B:
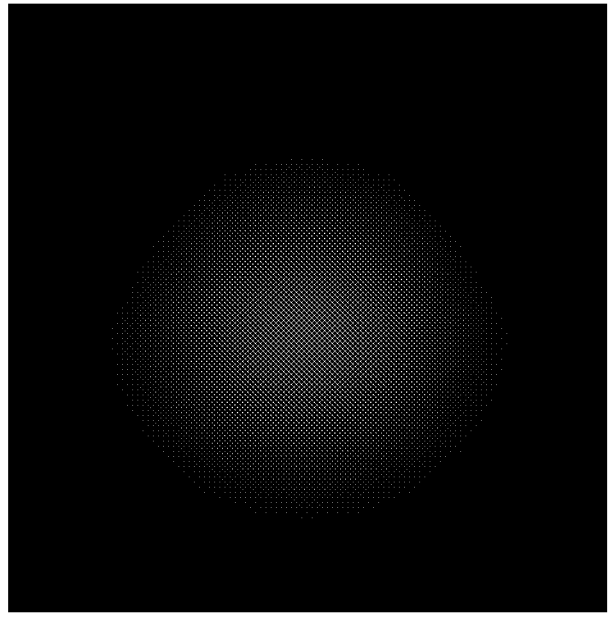
FIGS. 5A and 5B show results of the specular and diffuse reflectivity calculated from FIG. 1A using various embodiments of the invention.
Figure 5A:
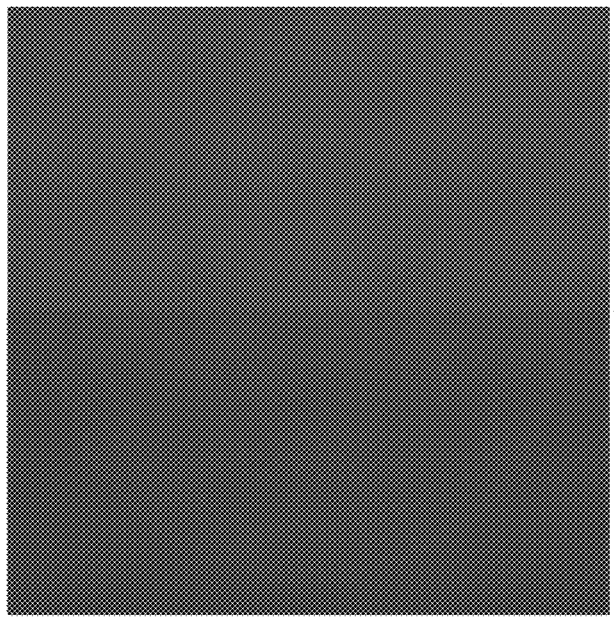

FIG. 5A shows the diffuse chromaticity component of FIG. 1A and FIG. 5B shows the specular chromaticity component of FIG. 1A calculated using embodiments of the invention. The results are consistent with what is shown in FIGS. 1B and 1C.

Embodiments of the invention can be used, for example, in image processing applications to select and edit specular reflections in images. For example, a user can select a command that initiates selection of specular reflections of the image. The command can call an algorithm that uses process 400 to find the specular reflections in the image. If, for example, the user requests that the image of fruit shown in FIG. 2A is processed, then the areas shown as white in FIG. 2B can be selected on the image. For example, the user can then selectively edit these specular reflection portions of the image. As another example, the user can change the shape, intensity, color, etc. of the portions of the image having specular reflections.

Embodiments of the invention can be executed on computational system 1000 as part of any type of image processing application or other another type of application. For instance, embodiments of the invention can be used in stereo matching applications. These applications extract 3D information from digital images by comparing information about a scene from two vantage points. Because specular reflection changes depending on the view point, one of the two images may pick up a specular reflection while the other does not. This can lead to miscalculations of 3D information. Thus, in stereo matching applications, input images can be analyzed for specular reflectivity prior to being used to extract 3D information. Once areas that include specular reflections have been identified, these areas can be corrected or ignored. For example, these areas can be replaced with averages of nearby portions of the image. Various other corrections can be used.

As yet another example, embodiments of the invention can be used in image segmentation applications. Image segmentation is the process of assigning a label to every pixel in an image such that pixels with the same label share certain visual characteristics. A specular reflection within an image can show the reflection rather than the color of the object upon which the reflection occurs. As such the color and/or intensity of pixels representing the specular reflection may not be labeled with the object, which is the object of image segmentation. This can lead to pixels being mislabeled or mis-segmented. Similar problems can occur in image recognition techniques.

Figure 6A:
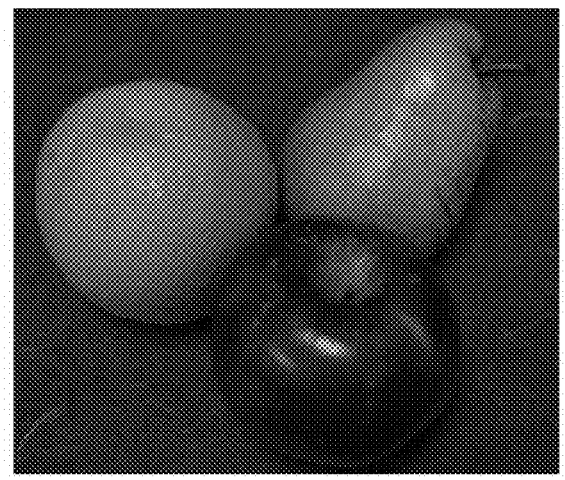
FIGS. 6A, 6B, 6C, and 6D show an input image, an image representing the specular chromaticity using embodiments of the invention, a dark channel image created from the input image using embodiments of the image, and an image representing the specular chromaticity using conventional techniques respectively.
Figure 6B:
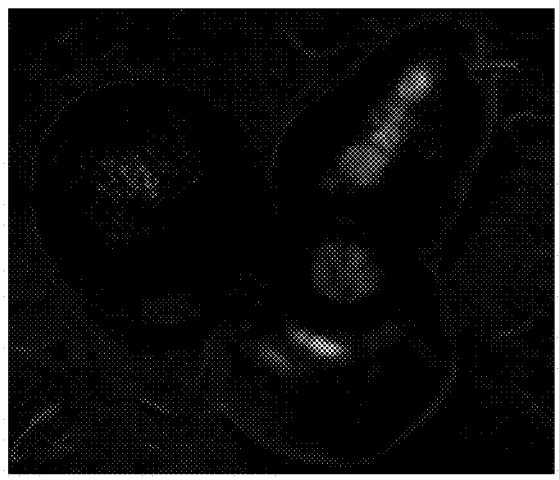
Figure 6C:
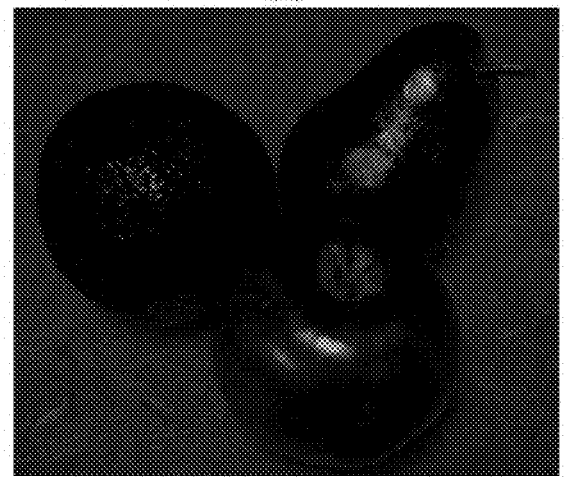
Figure 6D:

Embodiments of the invention can be used to provide improved specular information about an input image. This specular information FIG. 6A shows the input image shown in FIG. 2A. This image includes specular reflections 205 as noted above. FIG. 6B shows the specular reflection layer of FIG. 6A created using embodiments of the invention. FIG. 6C shows a dark channel image created using embodiments of the invention. This dark channel image can be created, for example, using equation 15. FIG. 6D shows an image representing the specular layer of the input image calculated using a conventional technique. Note the difference between the image in FIGS. 6B and 6D. In FIG. 6D, the conventional technique improperly considers the background as specular reflection. In FIG. 6B, the image created using embodiments of the invention, most of the background is not considered specular. Moreover, FIG. 6D and FIG. 6C are similar to one another. That is, the image created using conventional technique is very similar to the dark channel image created using embodiments of the invention.

Figure 7A:
FIGS. 7A, 7B and 7C show an input image and the specular layer calculated using conventional techniques and embodiments of the invention.
Figure 7B:
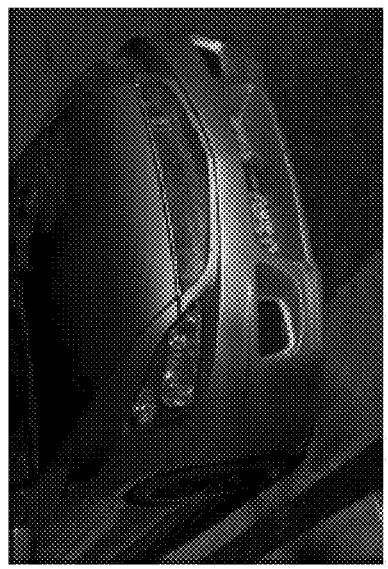
Figure 7C:
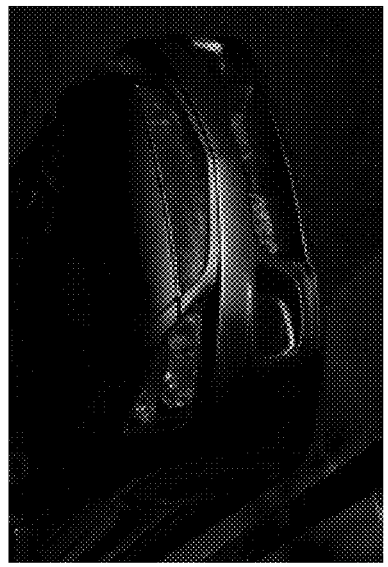
Figures 9A, 9B, 9C:
FIGS. 9A, 9B and 9C show an input image and the specular layer calculated using conventional techniques and embodiments of the invention.

FIGS. 7A, 8A and 9A show various examples of an input image with specular reflection components. FIGS. 7B, 8B and 9B show the specular layer of the corresponding input image calculated using various conventional techniques. FIGS. 7C, 8C and 9C show the specular layers of the corresponding input images calculated using embodiments of the invention. As shown, embodiments of the invention more properly specify specular components in the input images. For instance, FIGS. 7C, 8C, and 9C show less background in the specular layer. And each of these figures provides greater contrast between specular and non specular regions.

Figure 10:
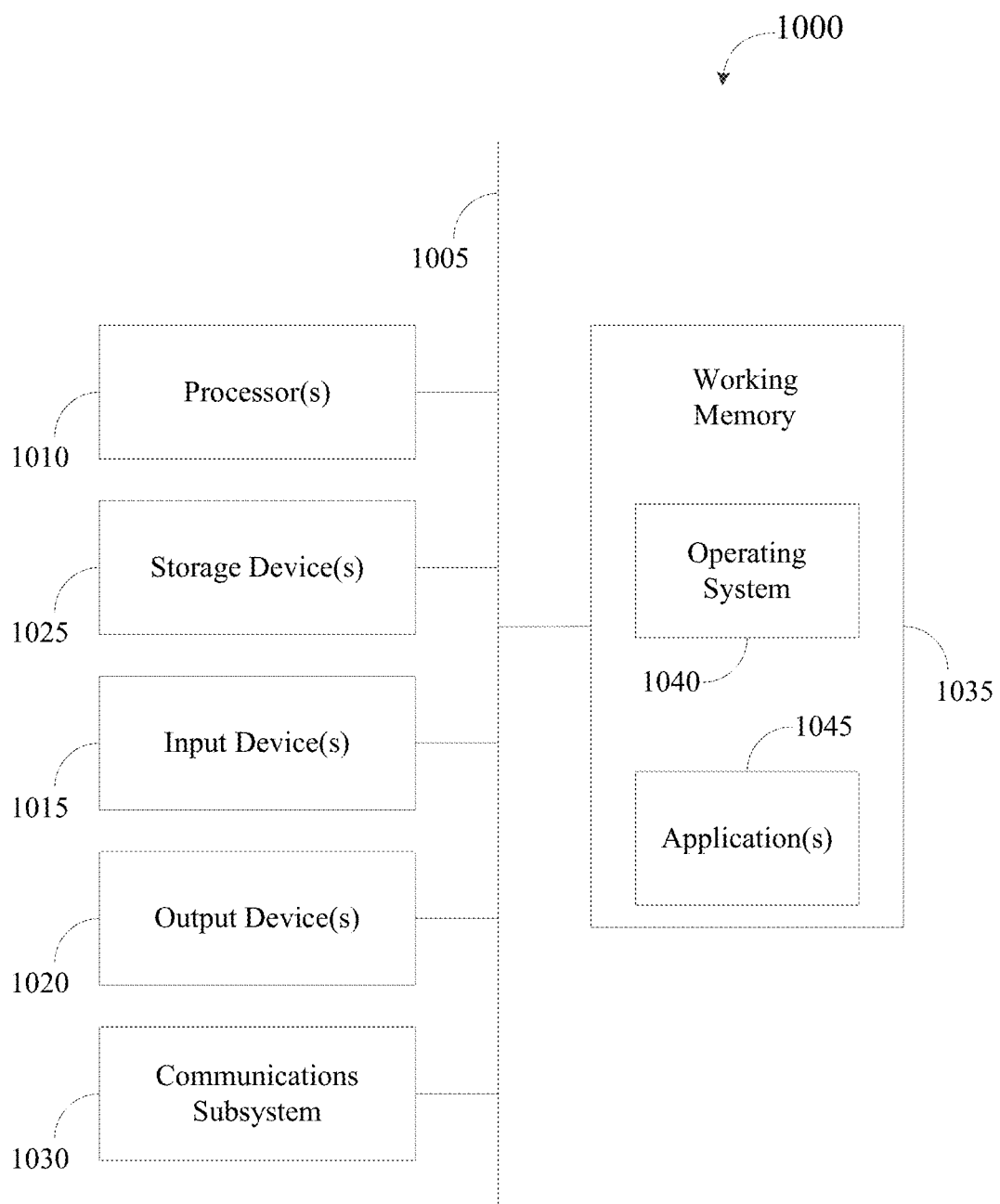
FIG. 10 shows an illustrative computational system for performing functionality to facilitate implementation of embodiments described herein.

The computational system 1000, shown in FIG. 10 can be used to perform any of the embodiments of the invention. For example, computational system 1000 can be used to execute process 400. As another example, computational system 1000 can be used to perform any calculation, identification and/or determination described here. Computational system 1000 includes hardware elements that can be electrically coupled via a bus 1005 (or may otherwise be in communication, as appropriate). The hardware elements can include one or more processors 1010, including without limitation one or more general-purpose processors and/or one or more special-purpose processors (such as digital signal processing chips, graphics acceleration chips, and/or the like); one or more input devices 1015, which can include without limitation a mouse, a keyboard and/or the like; and one or more output devices 1020, which can include without limitation a display device, a printer and/or the like.

The computational system 1000 may further include (and/or be in communication with) one or more storage devices 1025, which can include, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computational system 1000 might also include a communications subsystem 1030, which can include without limitation a modem, a network card (wireless or wired), an infrared communication device, a wireless communication device and/or chipset (such as a Bluetooth device, an 802.6 device, a WiFi device, a WiMax device, cellular communication facilities, etc.), and/or the like. The communications subsystem 1030 may permit data to be exchanged with a network (such as the network described below, to name one example), and/or any other devices described herein. In many embodiments, the computational system 1000 will further include a working memory 1035, which can include a RAM or ROM device, as described above.

The computational system 1000 also can include software elements, shown as being currently located within the working memory 1035, including an operating system 1040 and/or other code, such as one or more application programs 1045, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 1025 described above.

In some cases, the storage medium might be incorporated within the computational system 1000 or in communication with the computational system 1000. In other embodiments, the storage medium might be separate from a computational system 1000 (e.g., a removable medium, such as a compact disc, etc.), and/or provided in an installation package, such that the storage medium can be used to program a general purpose computer with the instructions/code stored thereon. These instructions might take the form of executable code, which is executable by the computational system 1000 and/or might take the form of source and/or installable code, which, upon compilation and/or installation on the computational system 1000 (e.g., using any of a variety of generally available compilers, installation programs, compression/decompression utilities, etc.) then takes the form of executable code.

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A method comprising:
   receiving an input image at a computer device, wherein the input image comprises a red channel, a green channel, and a blue channel;
   calculating a dark channel image from the input image, wherein each pixel value of the dark channel image comprises a lowest pixel value of a corresponding pixel of the red channel, a corresponding pixel of the green channel, and a corresponding pixel of the blue channel;
   calculating a pseudo specular-free image as a difference between the input image and the dark channel image;
   calculating a specular chromaticity of the input image from the pseudo specular-free image by:
      computing a cluster analysis on the pseudo specular-free image that clusters each pixel in the pseudo specular-free image into clusters having similar chromaticity, wherein the cluster analysis determines a chromaticity index for each pixel and a chromaticity vector that indicates an average chromaticity of each cluster represented by the chromaticity index, and
      solving an objective function to determine the specular chromaticity of the input image, wherein the objective function specifies that either (i) diffuse reflectivity is relatively constant within each cluster, or (ii) diffuse reflectivity changes sharply between clusters; and
   providing the calculated specular chromaticity of the input image.

2. The method according to claim 1, further comprising calculating a chromaticity of the pseudo specular-free image, and wherein the specular chromaticity of the input image is calculated using the chromaticity of the pseudo specular-free image.

3. The method according to claim 1, further comprising:
   solving an additional objective function to determine a specular reflectivity of the input image from the pseudo specular-free image, wherein the additional objective function specifies that specular reflectivity is smooth across edges within the input image; and
   providing the determined specular reflectivity of the input image.

4. The method according to claim 1, further comprising:
   solving an additional objective function to determine a specular reflectivity of the input image from the pseudo specular-free image, wherein the additional objective function specifies that diffuse reflectivity is relatively constant for the same chromaticity; and
   providing the determined specular reflectivity of the input image.

5. The method according to claim 1, further comprising:
   solving an additional objective function to determine a specular reflectivity of the input image from the pseudo specular-free image, wherein the additional objective function specifies that diffuse reflectivity is relatively constant within each cluster; and
   providing the determined specular reflectivity of the input image.

6. The method according to claim 1, further comprising:
   solving an additional objective function to determine a specular reflectivity of the input image from the pseudo specular-free image, wherein the additional objective function specifies that diffuse reflectivity changes sharply between clusters; and
   providing the determined specular reflectivity of the input image.

7. A system for determining a specular reflectivity comprising:
a digital storage device; and
a processor configured to:
receive an input image and store the input image in the digital storage device, wherein the input image comprises a red channel, a green channel, and a blue channel for each pixel in the input image;
calculate a dark channel image of the input image, wherein the dark channel image comprises a value for each pixel, each value corresponding to a lowest pixel value of a corresponding red channel pixel, a corresponding green channel pixel, and a corresponding blue channel pixel of the input image;
calculate a pseudo specular-free image as a difference between the input image and the dark channel image of the input image;
calculate the specular reflectivity of the input image from the pseudo specular-free image by:
computing a cluster analysis on the pseudo specular-free image that clusters each pixel in the pseudo specular-free image into clusters having similar chromaticity, wherein the cluster analysis determines a chromaticity index for each pixel and a chromaticity vector that indicates an average chromaticity of each cluster represented by the chromaticity index, and
solving an objective function to determine the specular reflectivity of the input image; wherein the objective function specifies that either (i) diffuse reflectivity is relatively constant within each cluster, or (ii) diffuse reflectivity changes sharply between clusters; and
provide the calculated specular reflectivity of the input image.

* * * * *